US006409801B1

(12) United States Patent
Shen et al.

(10) Patent No.: US 6,409,801 B1
(45) Date of Patent: Jun. 25, 2002

(54) ACTIVATION PROCESSES FOR MONOLITH ADSORBENTS

(75) Inventors: Dongmin Shen, Berkeley Heights; Sudhakar R. Jale, Scotch Plains; Frank R. Fitch, Bedminster; Ravi Jain, Bridgewater; Arthur I. Shirley, Piscataway; Yaping Lu, Scotch Plains; Divyanshu R. Acharya, Bridgewater, all of NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 49 days.

(21) Appl. No.: 09/676,012

(22) Filed: Sep. 29, 2000

(51) Int. Cl.$^7$ .............................................. B01D 53/02
(52) U.S. Cl. ........................... 95/130; 95/902; 423/700; 502/411; 502/415
(58) Field of Search ........................... 95/90, 138, 130, 95/900, 902, 903; 423/700; 502/411, 407, 415, 427, 430, 432, 435

(56) References Cited

U.S. PATENT DOCUMENTS

| 4,256,676 | A | | 3/1981 | Kovach |
| 5,268,023 | A | * | 12/1993 | Kirner |
| 5,464,467 | A | * | 11/1995 | Fitch et al. |
| 5,580,369 | A | | 12/1996 | Belding et al. |
| 5,616,170 | A | * | 4/1997 | Ojo et al. |
| 5,660,048 | A | | 8/1997 | Belding et al. |
| 5,660,221 | A | | 8/1997 | Oda et al. |
| 5,672,195 | A | * | 9/1997 | Moreau et al. |
| 5,685,897 | A | | 11/1997 | Belding et al. |
| 5,916,836 | A | * | 6/1999 | Toufar et al. |
| 5,962,358 | A | * | 10/1999 | Hees et al. |
| 5,972,835 | A | | 10/1999 | Gupta |
| 6,030,698 | A | | 2/2000 | Burchell et al. |
| 6,036,939 | A | * | 3/2000 | Funakoshi et al. |
| 6,051,051 | A | * | 4/2000 | Hees et al. |
| 6,143,057 | A | * | 11/2000 | Bulow et al. |
| 6,171,370 | B1 | * | 1/2001 | Hirano et al. |
| 6,231,644 | B1 | * | 5/2001 | Jain et al. |
| 6,258,152 | B1 | * | 7/2001 | Labasque et al. |
| 2001/0027723 | A1 | * | 10/2001 | Jain et al. |

FOREIGN PATENT DOCUMENTS

| DE | 41 40 455 A1 | 6/1993 |
| EP | 0 667 183 A1 | 8/1995 |
| EP | 0 842 697 A1 | 5/1998 |
| EP | 1 070 531 A2 | 1/2001 |

OTHER PUBLICATIONS

A. L. Myers, "Activity Coefficients of Mixtures Adsorbed on Heterogeneous Surfaces," AIChE Journal (vol. 29, No. 4), Jul., 1983, pp. 691–693.
Y. Yasuda, "Frequency Response Method for Investigation of Gas/Surface Dynamic Phenomena," Heterogeneous Chemistry Reviews, vol. 1, 103–124 (1994).
Y. Y. Li, S. P. Perera, B. D. Crittenden, "Zeolite Monoliths for Air Separation, Part 1: Manufacture and Characterization," Trans IChemE, vol. 76, Part A, Nov. 1998, pp. 921–930.
Y. Y. Li, S. P Perera, B. D. Crittenden, "Zeolite Monoliths for Air Separation, Part 2: Oxygen Enrichment, Pressure Drop and Pressurization," Trans IChemE, vol. 76, Part A. Nov. 1998, pp. 931–941.

* cited by examiner

Primary Examiner—Duane S. Smith
(74) Attorney, Agent, or Firm—Philip H. Von Neida; Salvatore P. Pace

(57) ABSTRACT

An improved method for preparing and activating monolith adsorbents is disclosed. A regeneration gas is passed through the formed monolith adsorbent at a temperature sufficient to decompose at least part of the binding agents in the adsorbent. The present invention also provides for the use of the treated adsorbent monoliths in separating gases in cyclical separation processes such as vacuum swing adsorption processes.

50 Claims, No Drawings

ACTIVATION PROCESSES FOR MONOLITH ADSORBENTS

FIELD OF THE INVENTION

The present invention provides processes for activating monolith adsorbents and for partially decomposing and/or removing the binding agents present in the monolith. More particularly, the present invention provides processes for using these monoliths in gas/vapor separation operations.

BACKGROUND OF THE INVENTION

Cyclic adsorption processes are frequently used to separate the components of a gas mixture. Typically, cyclic adsorption processes are conducted in one or more adsorbent vessels that are packed with a particulate adsorbent material which adsorbs at least one gaseous component of the gas mixture more strongly than it adsorbs at least one other component of the mixture. The adsorption process comprises repeatedly performing a series of steps, the specific steps of the sequence depending upon the particular cyclic adsorption process being carried out.

In any cyclic adsorption process, the adsorbent bed has a finite capacity to adsorb a given gaseous component and, therefore, the adsorbent requires periodic regeneration to restore its adsorption capacity. The procedure followed for regenerating the adsorbent varies according to the process. In VSA processes, the adsorbent is at least partially regenerated by creating vacuum in the adsorption vessel, thereby causing adsorbed component to be desorbed from the adsorbent, whereas in PSA processes, the adsorbent is regenerated at atmospheric pressure. In both VSA and PSA processes, the adsorption step is carried out at a pressure higher than the desorption or regeneration pressure.

A typical VSA process generally comprises of a series of four basic steps that includes (i) pressurization of the bed to the required pressure, (ii) production of the product gas at required purity, (iii) evacuation of the bed to a certain minimum pressure, and (iv) purging the bed with product gas under vacuum conditions. In addition a pressure equalization or bed balance step may also be present. This step basically minimizes vent losses and helps in improving process efficiency. The PSA process is similar but differs in that the bed is depressurized to atmospheric pressure and then purged with product gas at atmospheric pressure.

As mentioned above, the regeneration process includes a purge step during which a regeneration gas stream that is depleted in the component to be desorbed is passed countercurrently through the bed of adsorbent, thereby reducing the partial pressure of adsorbed component in the adsorption vessel which causes additional adsorbed component to be desorbed from the adsorbent. The non-adsorbed gas product may be used to purge the adsorbent beds since this gas is usually quite depleted in the adsorbed component of the feed gas mixture. It often requires a considerable quantity of purge gas to adequately regenerate the adsorbent. For example, it is not unusual to use half of the non-adsorbed product gas produced during the previous production step to restore the adsorbent to the desired extent. The purge gas requirement in both VSA and PSA processes are optimization parameters and depend on the specific design of the plant and within the purview of one having ordinary skill in the art of gas separation.

Many process improvements have been made to this simple cycle design in order to reduce power consumption, improve product recovery and purity, and increase product flow rate. These have included multi-bed processes, single-column rapid pressure swing adsorption and, more recently, piston-driven rapid pressure swing adsorption and radial flow rapid pressure swing adsorption. The trend toward shorter cycle times is driven by the desire to design more compact processes with lower capital costs and lower power requirements. The objective has been to develop an adsorbent configuration that demonstrates a low pressure drop, a fast pressurization time and an ability to produce the required purity of oxygen.

Honeycomb structured monoliths, which are normally made by high temperature treatment of a mixture of binders, additives and catalyst or adsorbent materials are suitable for fast cycle sorption processes. These monoliths, either in the form of one single block or in the form of extrudates with multiple random channels, exhibit unique features of low pressure drop, good mechanical properties and freedom from attrition and fluidization problems of conventional catalysts and adsorbents. These types of monoliths have historically been employed as catalyst supports in automobile catalytic converters, catalytic combustion, electrochemical reactors and biochemical reactors. These monoliths however have very low loadings of active catalyst or adsorbent and not all of the adsorbent or catalyst material is accessible to the gas molecules passing through them.

Monoliths, however, that are made from paper like sheets containing polymeric fibers as described in U.S. Pat. Nos. 5,660,048; 5,660,221; 5,685,897; and 5,580,369, exhibit very high loadings of adsorbent material. Active adsorbent materials such as zeolites, carbon molecular sieve (CMS), alumina and other porous adsorbent materials can be embedded in the paper during the manufacturing process. In order to bind adsorbent particles with fibers and to have uniform distribution of adsorbent particles, many ingredients and additives may also be added into the slurry during the sheet manufacturing. Normally, the non-woven-fabric sheet (paper), which will be shaped into the monolith in later stages, comprises fibers such as polyaramids, one or more binders such as acrylic latex, a flocculating agent and active adsorbent materials.

The binder is added to the slurry to bind the adsorbent particles to the fibers. Through this process, adsorbent/catalyst particles tend also to be encapsulated by the polymeric binder material. The adsorbent containing monoliths or sheets need to be activated at high temperatures to desorb water or other sorbed species from their active sites. The temperature at which the activation is undertaken is dependent on the nature of the adsorbent material. As described in U.S. Pat. No. 5,580,369, this activation is typically performed at temperatures below the decomposition temperature of the binder. This degree of activation is sufficient, if the adsorbate molecules can diffuse through the binder layer to reach the adsorbent/catalyst. It has been demonstrated that such an activation below the temperature of binder decomposition works well in dehumidification applications, where the diffusivity or solubility of water through the binder is high and adsorbent does not need higher temperature activation. However, it has been found in the current invention that in certain types of applications such as the adsorption of $N_2$ from air, the binder layer typically provides a kinetic barrier to adsorbate molecules from reaching the adsorbent particles. When this happens, the resulting monolith has poor kinetic performance for gas adsorption and desorption, which results in poor PSA/VSA performance in gas separation processes.

Low temperature activations may also be suitable for adsorbent materials, which do not interact strongly with moisture or other contaminants. However, adsorbents such as zeolites, particularly Li containing zeolites of type X and A require activation temperatures of at least 300° C., preferably greater than 400° C.

The present invention provides a novel method of activating monolith adsorbent and a binder decomposition such that improved adsorbent properties result.

SUMMARY OF THE INVENTION

The present invention provides for processes for removing binding agents from monolith adsorbents. These processes comprise passing a heated regeneration gas stream through the monolith at a temperature sufficient to decompose, at least part of the binder agent. The heated regeneration gas will also activate the active adsorbent materials that are contained within the monolith.

The present invention also provides for an improved process for preparing a monolith adsorbent comprising the steps of forming a slurry comprising water, fiber, binder, adsorbent and flocculating agent; forming paper from said slurry; forming a monolith containing said paper; the improvement comprising passing heated regeneration gas through the monolith, thereby decomposing the binding agent and activating the adsorbents contained therein.

The present invention further provides for a method for separating a first gaseous component from a gas mixture by passing the gas mixture into an adsorption zone containing a monolith adsorbent that has been treated by passing a heated regeneration gas through it thereby separating the first gaseous component from the gas mixture and recovering the adsorbed first gaseous component.

DETAILED DESCRIPTION OF THE PREFERRED EMBODIMENTS

The present invention provides a method for removing more than 50% of the binding agents from a monolith structure comprising passing a regeneration gas stream through the monolith at a temperature which will decompose part of the binding agent, and preferably 70–98% of the binding agent in the monolith.

The monolith structure typically contains an adsorbent which is included in the slurry mixture by which the paper used to manufacture the monolith is produced. The slurry is typically a mixture of water, natural or synthetic fibers, binders, flocculating agents, and additional chemicals which after being dried by gravity drain and/or by application of vacuum, can be formed into sheets. These sheets can then be formed into the appropriate shape for the monolith. Preferably, the monolith adsorbents that are treated by the methods of the present invention are already formed into preferred shapes.

The regeneration gas that is utilized may be an inert gas such as argon and nitrogen or an inert gas containing another gas component, which can oxidize organic species under the activation conditions such as oxygen, nitrous oxide and ozone or other type of gas like hydrogen, preferably nitrogen, air or mixtures thereof. This regeneration gas is heated to a temperature ranging from about 300° C. to about 500° C. The temperature to which the regeneration gas is heated will be dependent on the type of binder agent employed in forming the sheet, the nature of adsorbent in the monolith and the design of the finished formed monolith adsorbent.

The binding agents that are employed in manufacturing the paper sheet include but are not limited to acrylic latex, starch, polyvinyl alcohols, acrylics, polyurethane, polyethylene glycol, polypropylene glycol, polyacrylic acid, polyamide and polyamine. Other non-polymeric binders having a functionality of a carboxylic acid, aldehyde, amino acid, and amine can be employed. Inorganic binders such as silica and mineral silicates may also be used in manufacturing the paper sheet. When inorganic binders are used, only the organic functionality will be decomposed in addition to other organic chemical additives added during the stock preparation.

The fibers that are employed in manufacturing the sheets can be synthetic or natural and can be organic or inorganic. The synthetic organic polymeric fibers include aromatic polyamides, polyesters, polyvinyl chlorides, nylons, acrylics, polyethylenes, polypropylenes, acrylonitrile homopolymers, copolymers with halogenated monomers, styrene copolymers, and mixtures of polymers (polypropylene with low-density polyethylene, and high density polyethylene with polystyrene). The inorganic fibers include glass or metal fibers and rock wool etc. The natural fibers include wood pulp such as cellulose. Combination of organic and inorganic fibers can also be used. Fibrillated fibers, as described in U.S. Pat. No. 5,685,897, can also be used.

As noted above, the monolith structure when formed may take on any design and shape for use in gas separation processes. The formed monolith structure may include as adsorbents of zeolite type X, zeolite type A, ZSM-3, EMT, EMC-2, ZSM-18, ZK5, ZSM-5, ZSM-11, $\beta$, L, chabazite, offretite, erionite, mordenite, gmelinite, mazzite, and mixtures of these, alumina, silica, carbon molecular sieves, amorphous aluminosilicate and a clay material. Although various cationic forms of zeolites can be chosen, preferably, the adsorbent is a Li containing or Li and bivalent cation containing or Li and trivalent cation containing zeolite of type A and X, which contains Si/Al molar ratio of 0.9 to 1.25, preferably 1.0 to 1.1, and most preferably with Si/Al ratio of less than 1.08.

As shown by thermogravimetric analysis, there are three different regions of weight losses during the activation of monolith. The low temperature weight loss up to 150° C. is due to the weakly adsorbed water in zeolite. The weight loss from about 300 to 400° C. is due to the decomposition of binder and for some fibers from 500–600° C. is due to the decomposition of fiber. The desorption of strongly adsorbed zeolitic water generally occurs above 150° C., its loss overlapping with those of the binder and/or fiber weight losses. The shape of the weight loss curve depends on the type of binder used to manufacture the sheet, the temperature, the time and the nature of regeneration gas. The exact activation temperature depends on the nature of regeneration gas used for the activation. The activation should be carried out in such a way that most of the binder and zeolitic water will be removed without significantly damaging the fiber, which is the structural framework for the monolith. As such, the practice of the present invention will remove more than 50% of the binder from a monolith structure.

The temperature of the heated regeneration gas should be high enough to remove or decompose the binder material and activate the adsorbent materials. The removal of the binder material is not absolute as some binder must remain to bind the adsorbent material particles to the support as well as keep the corrugated structure of the monolith, while corrugated sheets are used to provide spaces in the formed monolith. If the regeneration gas contains an oxidizing gas component like oxygen, the binder can also be removed by the reaction with oxygen.

In the adsorption process embodiment of the invention, a component of a gas mixture that is more strongly adsorbed than other components of the gas mixture is separated from the other components by contacting the gas mixture with the adsorbent under conditions which effect adsorption of the strongly adsorbed component. Preferred adsorption processes include PSA, including vacuum swing adsorption (VSA), TSA and combinations of these.

The temperature at which the adsorption step of the adsorption process is carried out depends upon a number of factors, such as the particular gases being separated, the particular adsorbent being used, and the pressure at which the adsorption is carried out. In general, the adsorption step of the process is carried out at a temperature of at least about −190° C., preferably at a temperature of at least about −20° C., and most preferably at a temperature of at least about 0° C. The upper temperature limit at which the adsorption step of the process is carried out is generally about 500° C., and the adsorption step is preferably carried out at temperatures not greater than about 70° C., and most preferably carried out at temperatures not greater than about 50° C.

The adsorption step of the process of the invention can be carried out at any of the usual and well known pressures employed for gas phase temperature swing adsorption and pressure swing adsorption processes. Typically the minimum absolute pressure at which the adsorption step is carried out is generally about 0.7 bara (bar absolute), preferably about 0.8 bara and most preferably about 0.9 bara. The adsorption can be carried out at pressures as high as 50 bara or more, but is preferably carried out at absolute pressures not greater than about 20 bara, and most preferably not greater than about 10 bar.

When the adsorption process is PSA or VSA, the pressure during the regeneration step is reduced, usually to an absolute pressure in the range of about 0.1 to about 5 bara, and preferably to an absolute pressure in the range of about 0.175 to about 2 bara, and most preferably to an absolute pressure in the range of about 0.2 to about 1.1 bara.

As indicated above, the process of the invention can be used to separate any two gases, provided that one of the gases is more strongly adsorbed by the adsorbents of the invention than is the other gas under either conditions of equilibrium or non-equilibrium i. e., in the kinetic regime of a process. The process is particularly suitable for separating nitrogen from oxygen, nitrogen and argon from oxygen, carbon dioxide from air, dinitrogen oxide from air and for the separation of hydrocarbons, for example, the separation of alkenes, such as ethylene, propylene, etc., from alkanes, such as ethane, propane, etc., and the separation of straight-chain hydrocarbons from branched-chain hydrocarbons, e.g., the separation of n-butane from i-butane. Type A zeolites with appropriate cation compositions are particularly suitable for the separation of alkenes from alkanes, n-alkanes from i-alkanes and carbon dioxide from alkanes, alkenes and acetylene. The separation of these gases is preferably carried out at ambient temperature or higher, although the separation of nitrogen, oxygen and argon can be carried out at cryogenic temperatures.

It will be appreciated that it is within the scope of the present invention to utilize conventional equipment to monitor and automatically regulate the flow of gases within the system so that it can be fully automated to run continuously in an efficient manner.

The invention is further illustrated by the following examples in which, unless otherwise indicated, parts, percentages and ratios are on a weight basis.

EXAMPLE 1

Lithium and rare-earth containing LSX (LiRELSX) sample was made as disclosed in the EXAMPLE 1 of U.S. Pat. No. 5,464,467.

EXAMPLE 2–6

Handsheets containing LiRELSX, latex binder and Kevlar fiber were activated at different temperatures in an oven in the presence of various gases as described in Table 1. The temperature was first raised to 100° C. with a ramp of 20° C. per minute and kept there for 4 hours. It was then raised to the required temperature with a rate of 2° C. per minute. After the activation the monolith was cooled down to room temperature in flowing nitrogen.

TABLE 1

Activation conditions for the activation of LiRELSX handsheets in an oven

| Example # | Sample Name | Activation Temp. (° C.) | Carrier gas | Activation Time (hours) |
|---|---|---|---|---|
| 2 | Handsheet-300-$N_2$ | 300 | $N_2$ | 10 |
| 3 | Handsheet-400-$N_2$ | 400 | $N_2$ | 10 |
| 4 | Handsheet-300-0.5% $O_2$ | 300 | 0.5% $O_2$ in $N_2$ | 10 |
| 5 | Handsheet-400-0.5% $O_2$ | 400 | 0.5% $O_2$ in $N_2$ | 6 |
| 6 | Handsheet-350-Air | 350 | Air | 10 |

EXAMPLE 7–10

Adsorbent containing flat handsheet was bonded to a corrugated sheet of the same to form a single-faced corrugated sheet, which was then spirally wrapped to make a monolith structure containing plurality of parallel channels. These monolithic structures were activated at different temperatures in tubular furnace in the presence of $N_2$ or 0.5% $O_2$ or Air as described in Table 2. The temperature was first raised to 100° C. with a ramp of 20° C. per minute and kept there for 4 hours. It was then raised to the required temperature with a rate of 2° C. per minute. After the activation the monolith was cooled down to room temperature in flowing nitrogen.

TABLE 2

Activation conditions for the activation of LiRELSX containing monolithic structures

| Example # | Sample Name | Activation Temp. (° C.) | Carrier gas | Activation Time (hours) |
|---|---|---|---|---|
| 7 | Monolith-350-$N_2$ | 350 | $N_2$ | 10 |
| 8 | Monolith-400-$N_2$ | 400 | $N_2$ | 10 |
| 9 | Monolith-350-0.5% $O_2$ | 350 | 0.5% $O_2$ in $N_2$ | 8 |
| 10 | Monolith-400-0.5% $O_2$ | 400 | 0.5% $O_2$ in $N_2$ | 4 |

EXAMPLE 11

Adsorption isotherms of nitrogen ($N_2$) and oxygen ($o_2$) on the products of examples 2–10 were measured gravimetrically using Cahn 2000 Series microbalance enclosed in a stainless steel vacuum/pressure system. About 100 mg of handsheet sample was carefully evacuated and its temperature increased to that shown in TABLES 1 and 2 at a rate of 1°–2° C. per minute. The adsorption isotherms for nitrogen and oxygen were measured at 25° C. in the pressure range 20–6900 mbar for nitrogen and 20–2000 mbar for oxygen and the data fitted to a single and multiple site langmuir isotherm model. The fits to the nitrogen data were used to calculate the effective capacity for nitrogen at 25° C. and $N_2/O_2$ selectivities. The effective nitrogen capacity defined as the difference between the nitrogen capacity at 1000 mbar and that at 300 mbar gives a good indication of the capacity of the adsorbent in a PSA process operated between upper and lower pressures in this range. The selectivities of the samples for nitrogen over oxygen in air at 300 and 1000 mbar and 250° C. were derived from the pure gas isotherms for nitrogen and oxygen using Langmuir mixing rules (Ref. e.g. A. L. Myers: AIChE Journal: 29(4), (1983), p691–693). The usual definition for selectivity was used, where the selectivity (S) is given by:

$$S=(X_{N2}/Y_{N2})/(X_{O2}/Y_{O2})$$

where $X_{N2}$ and $X_{O2}$ are the mole fractions of nitrogen and oxygen, respectively, in the adsorbed phases, and $Y_{N2}$ and $Y_{O2}$ are the mole fractions of nitrogen and oxygen, respectively, in the gas phase. The adsorption results for the samples from Examples 2–10 are given Table 3.

TABLE 3

Adsorption capacities of handsheets activated under different conditions

| Example # | Sample Name | Effective $N_2$ capacity (mmol/g) | $N_2/O_2$ selectivity 1000 mbar | $N_2/O_2$ selectivity 300 mbar |
| --- | --- | --- | --- | --- |
| 2 | Handsheet-300-$N_2$ | 0.465 | 4.5 | 5.6 |
| 3 | Handsheet-400-$N_2$ | 0.569 | 5.5 | 7.8 |
| 4 | Handsheet-300-10% $O_2$ | 0.508 | 5.2 | 7.0 |
| 5 | Handsheet-400-10% $O_2$ | 0.531 | 6.0 | 8.9 |
| 6 | Handsheet-350-Air | 0.560 | 6.2 | 8.9 |
| 7 | Monolith-350-$N_2$ | 0.473 | 4.2 | 5.6 |
| 8 | Monolith-400-$N_2$ | 0.496 | 4.4 | 6.0 |
| 9 | Monolith-350-0.5% $O_2$ | 0.513 | 5.5 | 7.7 |
| 10 | Monolith-400-0.5% $O_2$ | 0.532 | 7.5 | 10.8 |

EXAMPLE 12

Theسorption kinetic performance of the monoliths were tested using the Frequency-Response method (V. Yasuda, Heterog. Chem. Rev., 1994, v.1, p.103). About 1.5 g of small monolith sheets (e.g. 8×25 mm) were placed into a sorption cell and activated in-situ under a vacuum $<10^{-4}$ torr at temperatures of 300, 350 and 400° C. After activation, the sample was cooled down to 25° C. Nitrogen was admitted into the sorption cell and allowed to reach an equilibrium of 5 torr of nitrogen. The sorption kinetic time constants of nitrogen in the monolith sheets were determined by modulating the volume of the sorption cell by c. ±1% at frequencies ranging from 0.001 to 10 Hz and then analyzing the pressure responses of the sorbate-sorbent system with an appropriate model. The overall sorption kinetic time constants obtained for nitrogen in the three monolith sheets activated at three different temperatures are compared in Table 4. A significant improvement in the uptake rates was made by increasing the activation temperature.

TABLE 4

Comparison of nitrogen sorption kinetics in the monolith sheets at 25° C. and 5 torr $N_2$

| Activation Temperature, ° C. | 300 | 350 | 400 |
| --- | --- | --- | --- |
| Relative Uptake Rate | 1 | 10~100 | ~1000 |

It can be seen that after activation, the sorption equilibrium and kinetic performances of the monolith materials for gas separation and purification are improved by one to three orders of magnitude which is very significant. This leads to a very significant increase in the performance of these monoliths in actual PSA/VSA operations.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

Having thus described the invention, what we claim is:

1. A process for removing binding agents from a monolith structure while activating the adsorbent in said monolith structure, comprising passing a regeneration gas through said monolith at a temperature which will decompose the binding agents in said monolith.

2. The process as claimed in claim 1 wherein said monolith structure contains one or more adsorbent materials.

3. The process as claimed in claim 1 wherein said regeneration gas is selected from the group consisting of nitrogen, argon, hydrogen, oxygen, nitrous oxide, ozone, and mixtures thereof.

4. The process as claimed in claim 1 wherein said temperature is sufficient to remove greater than 50% of the binding agents.

5. The process as claimed in claim 1 wherein said temperature is sufficient to remove between 70% and 98% of the binding agents.

6. The process as claimed in claim 1 wherein said temperature is in a range of about 300° C. to about 500° C.

7. The process as claimed in claim 1 wherein said binding agents are selected from the group consisting of acrylic latex, starch, polyvinyl alcohols, acrylics, polyurethane, polyethylene glycol, polypropylene glycol, polyacrylic acid, polyamide and polyamine.

8. The process as claimed in claim 2 wherein said adsorbent materials are selected from the group consisting of zeolite type X, zeolite type A, ZSM-3, EMT, EMC-2, ZSM-18, ZK-5, ZSM-5, ZSM-11, β, L, chabazite, offretite, erionite, mordenite, gmelinite, mazzite, and mixtures thereof, alumina, CMS, silica, silica gel, amorphous aluminosilicate and a clay materials.

9. The process as claimed in claim 7 wherein said adsorbent material comprises a zeolite type X or zeolite type A containing lithium, lithium and bivalent cations, or lithium and trivalent cations.

10. The process as claimed in claim 9 wherein said zeolite is X with an Si/Al ratio less than 1.08.

11. The process as claimed in claim 7 wherein said zeolites are sodium-containing zeolites.

12. The process as claimed in claim 7 wherein said adsorbent material is selected from the group consisting of type X zeolite, type A zeolite, and mordenite.

13. The process as claimed in claim 10 wherein said zeolites are low silicon type X zeolites with Si/Al ratio of 0.9 to 1.25.

14. The process as claimed in claim 12 wherein said zeolites are low silicon type X zeolites with Si/Al ratio of 1.0 to 1.1.

15. The process as claimed in claim 14 wherein said zeolite is X with an Si/Al ratio less than 1.08.

16. The process as claimed in claim 9 wherein said adsorbent material is selected from the group consisting of alumina and CMS.

17. An improved process for preparing a monolith adsorbent comprising the steps of: forming a slurry comprising water, fiber, binding agents, adsorbent and flocculating agent; forming paper from said slurry; forming a monolith containing said paper; the improvement comprising passing a regeneration gas stream through said monolith at a temperature sufficient to decompose at least part of the binding agent present in said adsorbent.

18. The process as claimed in claim 17 wherein said monolith structure contains one or more adsorbent materials.

19. The process as claimed in claim 17 wherein said regeneration gas is selected from the group consisting of nitrogen, argon, hydrogen, oxygen, nitrous oxide, ozone, and mixtures thereof.

20. The process as claimed in claim 17 wherein said temperature is sufficient to remove greater than 50% of the binding agents.

21. The process as claimed in claim 17 wherein said temperature is sufficient to remove between 70% and 98% of the binding agents.

22. The process as claimed in claim 21 wherein said temperature is in a range of about 300° C. to about 500° C.

23. The process as claimed in claim 17 wherein said binding agents are selected from the group consisting of acrylic latex, starch, polyvinyl alcohols, acrylics, polyurethane, polyethylene glycol, polypropylene glycol, polyacrylic acid, polyamide and polyamine.

24. The process as claimed in claim 18 wherein said adsorbent materials are selected from the group consisting of zeolite type X, zeolite type A, ZSM-3, EMT, EMC-2, ZSM-18, ZK-5, ZSM-5, ZSM-11, β, L, chabazite, offretite, erionite, mordenite, gmelinite, mazzite, and mixtures thereof, alumina, CMS, silica, silica gel, amorphous aluminosilicate and a clay materials.

25. The process as claimed in claim 17 wherein said adsorbent material is a zeolite type X or zeolite type A containing lithium, lithium and bivalent cations, or lithium and trivalent cations.

26. The process as claimed in claim 25 wherein said zeolite is X with an Si/Al ratio less than 1.08.

27. The process as claimed in claim 24 wherein said zeolites are sodium-containing zeolites.

28. The process as claimed in claim 24 wherein said adsorbent material is selected from the group consisting of type X zeolite, type A zeolite, and mordenite.

29. The process as claimed in claim 28 wherein said zeolites are low silicon type X zeolites with Si/Al ratio of 0.9 to 1.25.

30. The process as claimed in claim 29 wherein said zeolites are low silicon type X zeolites with Si/Al ratio of 1.0 to 1.1.

31. The process as claimed in claim 30 wherein said zeolite is X with an Si/Al ratio less than 1.08.

32. The process as claimed in claim 24 wherein said adsorbent material is selected from the group consisting of alumina and CMS.

33. A method of separating a first gaseous component from a gas mixture comprising a first gaseous component and a second gaseous component comprising:

(a) passing the gaseous mixture into an adsorption zone containing a monolith adsorbent through which an regeneration gas has been passed at a temperature which will decompose at least part of the binding agents in said monolith adsorbent and wherein said monolith adsorbent is capable of separating said first gaseous component from said second gaseous component; and (b) recovering the non-preferentially adsorbed gaseous component from said adsorption zone.

34. The method as claimed in claim 33 wherein said gaseous mixture is air and said first and said second gaseous components are oxygen and nitrogen.

35. The process as claimed in claim 33 wherein said monolith structure contains one or more adsorbent materials.

36. The process as claimed in claim 33 wherein said regeneration gas is selected from the group consisting of nitrogen, argon, hydrogen, oxygen, nitrous oxide, ozone, and mixtures thereof.

37. The process as claimed in claim 33 wherein said temperature is sufficient to activate the adsorbent materials in said monolith.

38. The process as claimed in claim 33 wherein said temperature is sufficient to remove greater than 50% of the binding agents.

39. The process as claimed in claim 33 wherein said temperature is sufficient to remove between 70% and 98% of the binding agents.

40. The process as claimed in claim 33 wherein said temperature is in a range of about 300° C. to about 500° C.

41. The process as claimed in claim 33 wherein said binding agents are selected from the group consisting of acrylic latex, starch, polyvinyl alcohols, acrylics, polyurethane, polyethylene glycol, polypropylene glycol, polyacrylic acid, polyamide and polyamine.

42. The process as claimed in claim 33 wherein said adsorbent materials are selected from the group consisting of zeolite type X, zeolite type A, ZSM-3, EMT, EMC-2, ZSM-18, ZK-5, ZSM-5, ZSM-11, β, L, chabazite, offretite, erionite, mordenite, gmelinite, mazzite, and mixtures thereof, alumina, CMS, silica, silica gel, amorphous aluminosilicate and a clay materials.

43. The process as claimed in claim 42 wherein said adsorbent material is a zeolite type X or zeolite type A containing lithium, lithium and bivalent cations, or lithium and trivalent cations.

44. The process as claimed in claim 43 wherein said zeolite is X with an Si/Al ratio less than 1.08.

45. The process as claimed in claim 43 wherein said zeolites are sodium-containing zeolites.

46. The process as claimed in claim 45 wherein said adsorbent material is selected from the group consisting of type X zeolite, type A zeolite, and mordenite.

47. The process as claimed in claim 46 wherein said zeolites are low silicon type X zeolites with Si/Al ratio of 0.9 to 1.25.

48. The process as claimed in claim 47 wherein said zeolites are low silicon type X zeolites with Si/Al ratio of 1.0 to 1.1.

49. The process as claimed in claim 48 wherein said zeolite is X with an Si/Al ratio less than 1.08.

50. The process as claimed in claim 42 wherein said adsorbent material is selected from the group consisting of alumina and CMS.

* * * * *